US007506139B2

(12) United States Patent
Burky et al.

(10) Patent No.: US 7,506,139 B2
(45) Date of Patent: Mar. 17, 2009

(54) METHOD AND APPARATUS FOR REGISTER RENAMING USING MULTIPLE PHYSICAL REGISTER FILES AND AVOIDING ASSOCIATIVE SEARCH

(75) Inventors: William E. Burky, Austin, TX (US); Krishnan K. Kailas, Tarrytown, NY (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/456,878

(22) Filed: Jul. 12, 2006

(65) Prior Publication Data

US 2008/0016324 A1    Jan. 17, 2008

(51) Int. Cl.
  *G06F 15/00* (2006.01)
(52) U.S. Cl. ..................................... 712/217
(58) Field of Classification Search .................. 712/217
  See application file for complete search history.

(56) References Cited

U.S. PATENT DOCUMENTS 5,630,157 A * 5/1997 Dwyer, III .................... 712/23
5,974,525 A * 10/1999 Lin et al. ...................... 712/23
6,314,511 B2 * 11/2001 Levy et al. ................. 712/217
2004/0015904 A1 * 1/2004 Jourdan et al. .............. 717/141

OTHER PUBLICATIONS

"Register Renaming and Dynamic Speculation: an Alternative Approach", Mayan Moudgill, Keshav Pingali, and Stamatis Vassiliadis, Sep. 15, 1993, pp. 1-13.

* cited by examiner

*Primary Examiner*—Eddie P Chan
*Assistant Examiner*—John Lindlof
(74) *Attorney, Agent, or Firm*—Cantor Colburn LLP; Derek Jennings

(57) ABSTRACT

A method for implementing a register renaming scheme for a digital data processor using a plurality of physical register files for supporting out-of-order execution of a plurality of instructions from one or more threads, the method comprising: using a DEF table to store the instruction dependencies between the plurality of instructions using the instruction tags, the DEF table being indexed by a logical register name and including one entry per logical register; using a rename USE table indexed by the instruction tags to store logical-to-physical register mapping information shared by multiple sets of different types of non-architected copies of logical registers used by multiple threads; using a last USE table to transfer data of the multiple sets of different types of non-architected copies of logical registers into the first set of architected registered files, the last USE table being indexed by a physical register name in the second set of rename registered files; and performing the register renaming scheme at the instruction dispatch or wake-up/issue time.

1 Claim, 4 Drawing Sheets

| Stage | Operations |
|---|---|
| Dependency tracking | • For each source register of the instruction, use its Lreg to read out the Itag of the last instruction that wrote the source register and its V bit from the DEF table (indexed by Lreg).<br>• Use the Lreg of the destination register (GPR, FPR and VR) as the address to write the instruction's Itag, desination register type and set V bit. |
| Rename | • Use thread ID of the instruction to select its rename USE table (indexed by Itag)<br>• <u>Rename destination register (assign Rtag for Lreg)</u><br>  • Select one of the free Rtags from the allocation buffer associated with the Free list table (indexed by Rtag; shared by all threads) of the destination register type.<br>  • write Itag of the instruction at the Free list table entry selected using Rtag and reset associated F (free) bit of the Rtag to 0<br>  • write Rtag and register type at the rename USE table entry selected using Itag and set the Vbit<br>  • copy the Itag of the instruction as the LastUSEitag of assigned physical register in the last USE table<br>• <u>Identify Rtag of the source physical register</u><br>  • read rename USE table using Itag of the source register (read from DEF table in dependency tracking stage)<br>  • if the V bit read out from rename USE table is 0 (i.e., DEF instruction is committed and there are no in-flight instructions that may read RRF to access this register data), then select Lreg as the Rtag (to access ARF), otherwise select the Rtag returned from rename USE table (to access RRF)<br>  • copy the Itag of the instruction as the LastUSEitag of the physical register mapped to each source Lreg in the last USE table |
| Commit | • Use Rtag of the destination Lreg to copy the data residing in the renamed physical register in RRF to ARF<br>• Rtags assigned to each source Lreg is compared against its LastUSEitag entry stored in the last USE table. The V bit of the rename USE table is reset as well as the F bit of its entry in Free list table is set if the itags match (to indicating that the physical register is now free for allocation again).<br>• Reset the V bit in DEF table using itag as the address. |

FIG. 4

METHOD AND APPARATUS FOR REGISTER RENAMING USING MULTIPLE PHYSICAL REGISTER FILES AND AVOIDING ASSOCIATIVE SEARCH

GOVERNMENT INTEREST

This invention was made with Government support under contract No.: NBCH3039004 awarded by Defense Advanced Research Projects Agency (DARPA). The Government has certain rights in this invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to digital data processing systems, and particularly to a renaming scheme used for supporting out-of-order speculative execution of instructions.

2. Description of Background

There are many factors that affect performance and effective utilization of resources in modern processors. Some of these factors include data dependencies between instructions as specified by semantics of a program, a finite number of architected registers determined by an instruction set architecture (ISA), and an inability to disambiguate all memory references at compile time by limiting an amount of instruction-level parallelism (ILP) that is exposed through program binaries.

Several micro-architecture techniques are used in the processors to extract more ILP from programs. For example, a small number of architected or logical register names causes output and anti-dependencies between instructions in a program binary. These false dependencies affect processor performance because it forces serialized execution of instructions. Register renaming is a technique used by an instruction-scheduling unit of out-of-order superscalar processors to eliminate serialized execution of instructions due to output and anti-dependencies. Register renaming is a process of mapping a relatively small architected or logical register name space to a large physical register name space in order to enable out-of-order execution of multiple instructions in such a manner that they are only constrained by true data dependencies. Moreover, the register renaming logic with the help of some additional hardware is also used to enable speculative execution of instructions via maintaining multiple versions of logical registers (in different physical registers) and providing support to restore the processor state to an appropriate non-speculative state whenever the speculative execution turns out to be wrong.

Several hardware techniques have been proposed and used for implementing register renaming for out-of-order execution of instructions. These register-renaming techniques are broadly classified into two approaches. One approach is based on Tomalosulo's algorithm using reservation stations and the other approach is based on a mapping table. Additional structures such as reorder buffers, history buffers, future files, checkpoint/backup register files or shadow mapping tables may be added or combined with the basic renaming hardware to save and restore the architected register state for supporting speculative execution and precise interrupts.

In particular, the instructions in a program binary use a small set of logical (or architected) register names specified by the instruction set architecture (ISA) of the processor. The logical registers are mapped to a larger set of physical registers by the register renaming hardware. The physical registers used for storing the logical register values are organized as a single register file or two register files, those being an Architected Register File (ARF) and Rename Register File (RRF).

The register contents are copied from rename register file to architected register file (and marked free for renaming) whenever all the instructions referring to a particular architected register are completed. Note that, unlike in a compiler, the only way to know the end of a live range is whenever it becomes the target of a young instruction. However, in our renaming scheme, for the purpose of copying a rename register entry, it is assumed that a live range of an architected register ends whenever none of the in-flight instructions use it as a source register. To identify the set of "active" registers that will not be read by any in-flight instructions, a counter may be associated with each mapper table entry as described in the conference paper entitled "Register Renaming and Dynamic Speculation: an Alternative Approach" by Moudgill et al. published in the Proceedings of the 26th annual international symposium on Microarchitecture, 1993. The counter associated with a renamed physical register may be incremented at dispatch of every source register mapped to it and decremented whenever such an instruction completes. This counter-based physical register solution is an expensive solution that is not desirable. The exemplary embodiments propose detecting the end of "live-range" among the instructions in flight in order to reclaim a physical register in RRF used for renaming.

One of the common characteristics of all the prior register renaming schemes is that all of them use an associative search by using either CAM (Content Accessible Memory) structures or an array of parallel comparators on tables with large number of entries. The complexity and power consumed by the logic structures used for implementing such associative search functions is one of the major inhibitors for implementing high frequency out-of-order superscalar processors. Therefore a register-renaming scheme that does not involve any associative search functions is highly desirable.

In particular, it has been shown that out-of-order execution would help improve performance of a program, in particular SPEC INT benchmarks. However, having a separate mapper (register renaming unit) for each type of registers is expensive, making it unattractive for wide-issue high-frequency superscalar processor designs. The exemplary embodiments use processor architectures with a separate set of architected register files for each type of registers and threads along with a small set of physical registers using a shared mapper for renaming. As evident from the above discussion, conventional methods have limitations or inefficiencies, requiring a different approach to efficiently manage the renaming operations in an out-of-order superscalar processor.

Thus, it is well known that renaming registers affects effective utilization of resources in modern processors. Therefore, it is desired to develop an efficient method and apparatus for renaming registers that reduces hardware complexity as well as the number of rename registers by using multiple physical register files and avoiding associative searching.

SUMMARY OF THE INVENTION

The shortcomings of the prior art are overcome and additional advantages are provided through the provision of a method for implementing a register renaming scheme for a digital data processor using a plurality of physical register files for supporting out-of-order execution of a plurality of instructions, the method comprising: partitioning the plurality of physical register files into a first set of register files having a fixed one-to-one mapping with a first set of logical registers in the architected state and into a second set of register files being mapped to a second set having multiple copies of logical registers in a non-architected state by a register-renaming unit; assigning an instruction tag to each of the plurality of instructions for tracking instruction dependencies; using a DEF table to store the instruction dependencies between the plurality of instructions using the instruction tags, the DEF table being indexed by a logical register name and including one entry per logical register; using a rename USE table indexed by the instruction tags to store logical-to-physical register mapping information shared by multiple sets of different types of non-architected copies of logical registers used by multiple threads; using a last USE table to transfer data of the multiple sets of different types of non-architected copies of logical registers into the first set of architected registered files, the last USE table being indexed by a physical register name in the second set of rename registered files; and performing the register renaming scheme at the instruction dispatch or wake-up/issue time in order to reduce a number of the plurality of physical register files.

The shortcomings of the prior art are overcome and additional advantages are provided through the provision of a system for implementing a register renaming scheme for a digital data processor using a plurality of physical register files for supporting out-of-order execution of a plurality of instructions, the system comprising: a network; and a host system in communication with the network, the host system including software to implement a method comprising: partitioning the plurality of physical register files into a first set of register files having a fixed one-to-one mapping with a first set of logical registers in the architected state and into a second set of register files being mapped to a second set having multiple copies of logical registers in a non-architected state by a register-renaming unit; assigning an instruction tag to each of the plurality of instructions for tracking instruction dependencies; using a DEF table to store the instruction dependencies between the plurality of instructions using the instruction tags, the DEF table being indexed by a logical register name and including one entry per logical register; using a rename USE table indexed by the instruction tags to store logical-to-physical register mapping information shared by multiple sets of different types of non-architected copies of logical registers used by multiple threads; using a last USE table to transfer data of the multiple sets of different types of non-architected copies of logical registers into the first set of architected registered files, the last USE table being indexed by a physical register name in the second set of rename registered files; and performing the register renaming scheme at an instruction dispatch or wake-up/issue time in order to reduce a number of the plurality of physical register files.

Additional features and advantages are realized through the techniques of the present invention. Other embodiments and aspects of the invention are described in detail herein and are considered a part of the claimed invention. For a better understanding of the invention with advantages and features, refer to the description and the drawings.

Technical Effects

As a result of the summarized invention, technically we have achieved a solution that provides for an efficient register-renaming scheme by using multiple physical register files and avoiding associative searching.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates one example of a table showing operations for allocating and freeing physical registers to logical registers in accordance with the exemplary embodiments of the present invention.

DETAILED DESCRIPTION OF THE INVENTION

Figure 1:
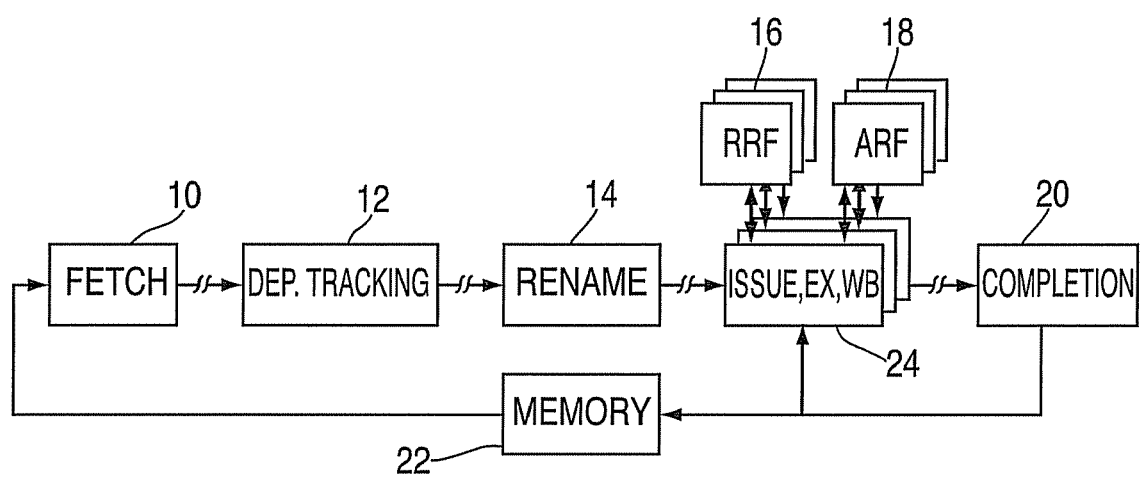
FIG. 1 illustrates one example of a pipeline block diagram of a processor for register renaming and speculative out-of-order execution using two sets of physical register files in accordance with exemplary embodiments of the present invention.

One aspect of the exemplary embodiments is a method for renaming registers. Another aspect of the exemplary embodiments is a method for reducing the complexity and size of register renaming hardware by using a shared mapping table indexed by instruction tags to store logical-to-physical register mapping for different types of logical registers (such as general-purpose or integer registers (GPRs), floating-point registers (FPRs), vector registers (VRs), etc.) used by multiple threads and avoiding associative searching.

The exemplary embodiments provide for a technique for implementing an area and power efficient renaming scheme for a digital data processor using multiple physical register files. The exemplary embodiments further provide for an improved pipeline processor design which exploits simple hardware structures for register renaming to execute instructions at a higher rate than known pipeline processors by enabling higher clock frequency processor designs. In addition, the exemplary embodiments provide for a technique to transfer multiple versions of the renamed logical register data stored in physical registers in one or more rename register files to another set of architected register files using simpler hardware logic to minimize the number of physical registers needed for renaming. The exemplary embodiments demonstrate a method of implementing a register-renaming scheme for a digital data processor using a plurality of physical register files for supporting out-of-order execution of a plurality of instructions.

According to the exemplary embodiments, these features are accomplished by providing:

(1) A register renaming scheme that uses a number of tables that are accessed by index in different pipeline stages during execution in lieu of renaming schemes that use associative searches, (2) Using a DEF table to store the dependencies between instructions using instruction tags, (3) Using a rename USE table indexed by instruction tags to store the logical-to-physical register mapping information that are shared by non-architected copies of different types of registers written by instructions from multiple threads, and (4) Using a last USE table to efficiently transfer logical register data residing in multiple physical register files into an architected register file.

Contemporary OO (out-of-order) superscalar processors perform register renaming for target registers of all the instructions first, and then perform out-of-order issue from an issue queue. This is similar to a register allocation followed by an instruction scheduling scheme in a compiler, and therefore may be subject to similar phase-ordering problems. It has been shown that combined register allocation and scheduling can generate better quality code. Therefore, it may be possible to reduce the number of physical registers needed and the associated renaming (mapper) logic complexity, if the renaming is performed only when an instruction is selected for issue. Similar to the combined register allocation and scheduling based code generation schemes, in order to male the best use of the resources, renaming is required to be performed, on demand, as late as possible at the instruction wake-up/issue time. The exemplary embodiments provide a scheme to implement such an efficient out-of-order execution of instructions in an OO superscalar processor.

A pipeline of an out-of-order superscalar processor includes of a number of stages. FIG. 1 illustrates pipeline stages that are relevant to the exemplary embodiments. Instructions are fetched via the fetch block 10 from the memory 22 that is closest to the processor (not shown). The fetched instructions go through a number of front-end pipeline stages implementing the functions such as decoding, cracking, grouping, etc. before it reaches the pipeline stage for tracking 12 the instruction dependencies. The instruction dependencies are often tracked based on the logical register names. In the exemplary embodiments, instruction dependencies are tracked using the instruction tags (or Itags) to simplify the hardware structures needed for renaming. Specifically, the pipeline stages implementing such functions are a rename block 14, a plurality of issue blocks 24, and a completion block 20.

Every instruction (or an (IOP Internal operation), in case the instruction is cracked into simple internal operations or substituted with a set of internal instructions known as its milli-code) has a set of source operands and destination operands specified using logical register names. An instruction writing to a destination logical register is called its "DEF instruction." An instruction reading a value from a source logical register is called the "USE instruction" of the source register.

A DEF table is used for tracking the dependencies between instructions. Specifically, it is used for identifying the most recent (youngest) instruction writing to a logical register. The DEF table is indexed by the logical register name. It has one entry per logical register, consisting of the Itag (lastDEFitag) of the youngest DEF instruction and a valid bit. In a multi-threaded processor, such as a simultaneously multithreaded (SMT) processor, there is one DEF table for each register type per thread.

There are two sets of physical register files called the Architected Register Files (ARF) 18 and the Rename Register Files (RRF) 16 for storing the architected and non-architected copies of register values, as shown in FIG. 1. Note that there are a plurality of RRF files incorporated in the RRF block 16 and a plurality of ARF files incorporated in the ARF block 18.

Typically each type of registers used by instructions, such as GPRs, FPRs, and VRs, has a separate copy of ARF and RRF. The ARF 18 stores the architected state of the registers, which is the non-speculative of the logical register values written by instructions that are committed. A physical register in ARF 18 has a fixed one-to-one mapping with logical registers, and hence ARF 18 is indexed by the logical register names. The RRF 16 is used for storing multiple versions of the logical register values written by instructions that are executed speculatively and/or out-of-order. The physical registers in RRF 16 are mapped to any logical registers by a register-renaming unit (mapper). The registers written by instructions that are in-flight (dispatched, but not completed) are mapped to RRF 16. The oldest versions of the logical register data in RRF 16 are copied to ARF 18 when its DEF instruction is committed. However, an RRF entry cannot be reused (or used as the target for renaming) until all the instructions in-flight that may use it are also committed.

Figure 3:
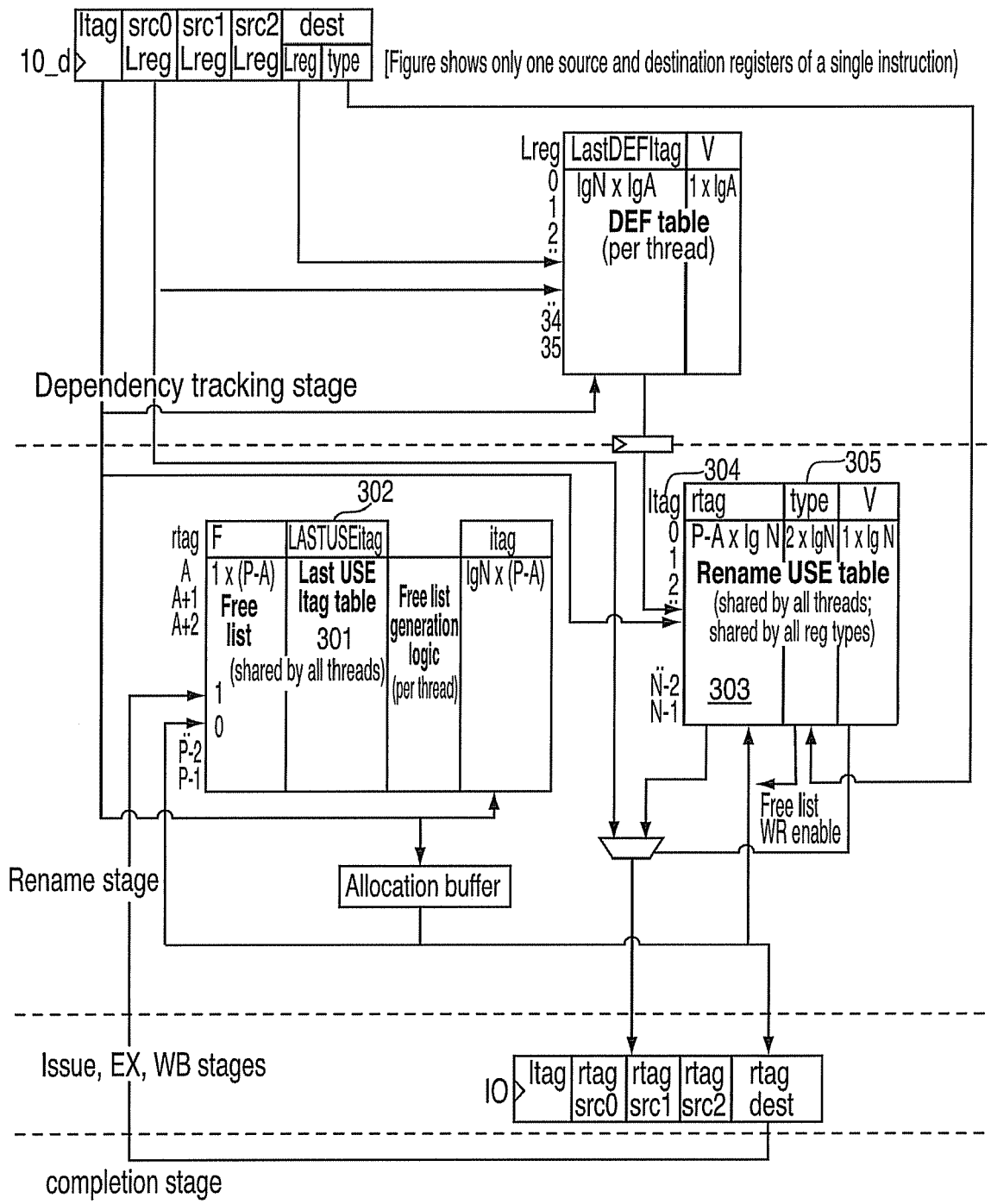
FIG. 3 illustrates one example of a structure for assigning physical registers to logical registers and reclaiming rename registers according to the exemplary embodiments of the present invention.

FIG. 3 illustrates one example of a structure for assigning physical registers to logical registers and reclaiming rename registers. A rename USE table 303 is used for storing the physical-to-logical register name mapping information. The rename USE table 303 is indexed by the instruction tag (Itag) 304 of the DEF instruction. Therefore, each instruction has an entry in the rename USE table 303, and a USE table entry consists of the tag (Rtag, the index used to access the RRF) of the physical register location used for storing the logical register value written by the instruction, the type 305 of the register written by the instruction and a valid (V) bit. The rename register file for a given register type is shared by multiple threads in a multi-threaded processor.

In the "dependency tracking" stage of the pipeline (after fetch and decode stages), incoming instructions access the DEF table to read out the Itag of the DEF instruction for each one of its source operands (logical registers), replace the lastDEFitag entry corresponding to its destination logical register with its Itag and set the V bit. The V bit is reset when an instruction is committed or flushed.

Figure 2:
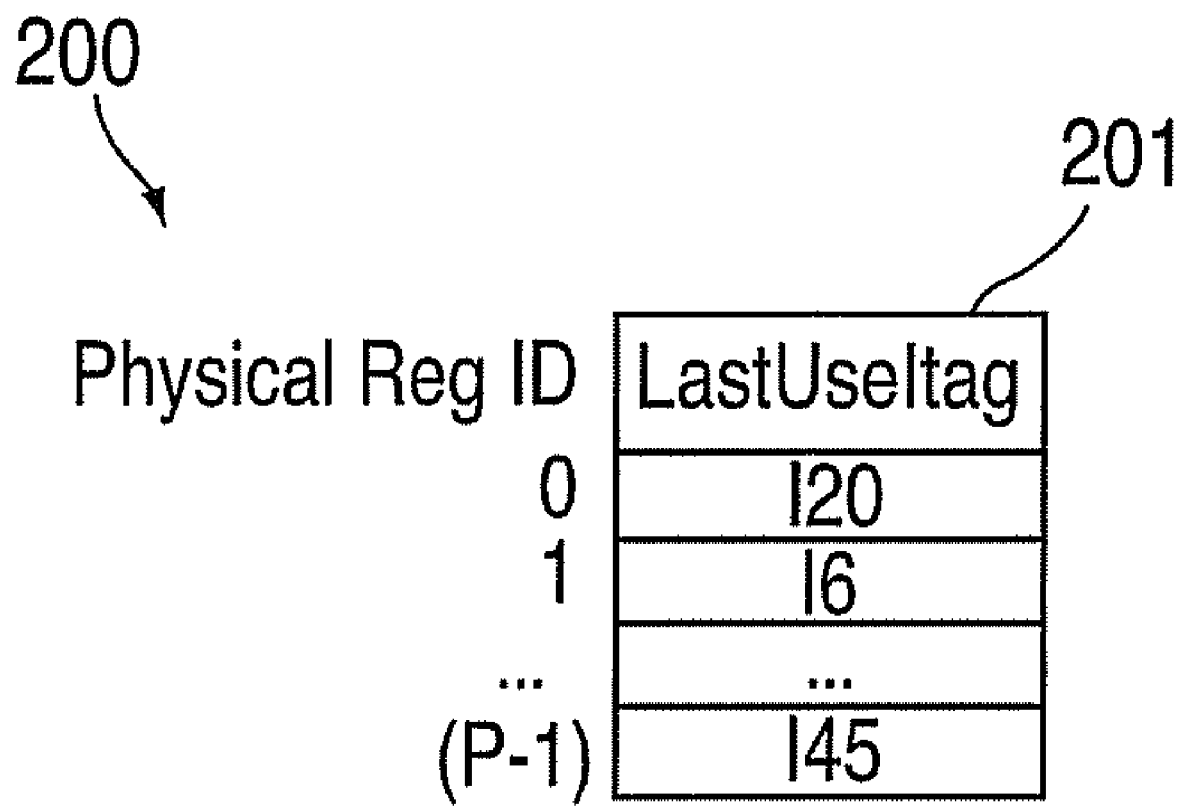
FIG. 2 illustrates one example of a Last Use table.

Referring to FIGS. 2 and 3, a last USE table 200, 301 is used to keep track of the last instruction that reads a given logical register value residing in the RRF. The last USE table is indexed by the physical register name (Rtag) in RRF. For each physical register in the RRF there is an entry in the last USE table, which stores the Itag of the youngest instruction (LastUseItag 201, 302) that reads it, as shown in FIG. 2 and 3.

FIG. 3 illustrates one example of a table showing operations for allocating and freeing physical registers to logical registers. The renaming (mapping) of a destination logical register is performed by assigning the Rtag (the index used to access the RRF) of a physical register to it. The renaming operation is carried out in the "rename stage" of the pipeline as shown as in FIG. 1, which can be as late as in the issue stage. The rename USE table entry corresponding to the Itag of the instruction being renamed is updated by writing the Rtag of the RRF register assigned to its destination register and setting the V bit. At the time of renaming an instruction, the last USE table entry corresponding to the Rtag assigned to its destination register is updated by copying the Itag of the instruction to it as its last USE instruction. There is a free-list generation logic that keeps track of the physical registers in RRF that are not mapped to any logical registers and an allocation buffer to keep a subset of the Rtags of such free physical registers.

The Rtags of the physical registers mapped to the source operand logical registers are needed to access the source operand values for executing an instruction. The logical register value can reside in either ARF or RRF. The RRF has a copy of source register value if its DEF instruction is still in-flight or there is at least one in-flight instruction that may try to access it; otherwise the source register value can be read from the ARF. The Itag of the DEF instruction of the source register is used to read out the Rtag of the physical register assigned to the source logical register from the rename USE table if V bit is set. If the V bit in rename USE table is zero (reset) then the value can be read from the ARF (using the logical register name as the Rtag of the ARF). If a source operand register is found to be mapped to a physical register in RRF at the time of renaming an instruction, its mapped physical register's LastUseItag 302 in the last USE table is replaced with the Itag 304 of the USE instruction being renamed.

In order to efficiently use the physical registers in RRF, the renamed copies of the logical register values in the RRF are to be copied to ARF and the mapped physical register in RRF is to be marked free as soon as possible. This can be performed by using the LastUseItag 302, which is the Itag of the last in-flight instruction that may read the mapped physical register in RRF. At the time of completion of an instruction, the destination register value is moved from RRF to ARF. However, the V bit in the rename USE table cannot be reset to indicate that the physical register can now be moved to free-list until it is certain that no in-flight instructions tries to access its copy in RRF. At the time of committing an instruction, its Itag is compared with the LastUseItag 302 (in last USE table) for each of its source operands if it is accessed from RRF. If the Itags are the same, then it is determined that there are no younger instructions in-flight that can access this physical register, and hence this rename register can be marked free by setting the V bit in rename USE table and setting the F bit in the free list. The V bit is reset and the F bit is set whenever instructions are flushed as well.

Furthermore, the physical registers are partitioned into two sets. One set of physical registers has a fixed one-to-one mapping with architected registers, henceforth referred to as "architected register array/file." The other set of physical registers, henceforth referred to as "rename register array/file," is mapped to any architected registers by a register-renaming unit (mapper). The registers used by instructions that are in-flight (dispatched, but not completed) are mapped to either one or both of the above physical register files. The mapper logic performs the register renaming by mapping the architected register to one of the physical registers in the rename register file. It also keeps a copy of the previous mapping info for flush/recovery. The dispatch unit sends instructions to the appropriate issue queues whenever the issue queue can accept new instructions, usually without renaming the target registers (i.e., using registers in the architected register file). However, if the target register of an instruction is already renamed and mapped to a physical register in the rename register file, then the target register is renamed prior to dispatch using the mapper logic.

The wake-up logic identifies all the instructions residing in the issue queue that are "data ready" and selects one or more of the instructions to be issued to the appropriate execution pipelines 24. Whenever there are no data ready instructions in the issue queue and if one or more of the instructions in the issue queue can be made data ready by register renaming, the target register of such instructions are renamed using the mapper logic, provided there are free registers in the rename register array.

As a result, the exemplary embodiments provide for a technique for implementing an area and power efficient renaming scheme for a digital data processor using multiple physical register files. The exemplary embodiments further provide for an improved pipeline processor design which exploits simple hardware structures for register renaming to execute instructions at a higher rate than known pipeline processors by enabling higher clock frequency processor designs. In addition, the exemplary embodiments provide for a technique to transfer multiple versions of the renamed logical register data stored in physical registers in one or more register files to another architected register file using simpler hardware logic by maximizing the usage of physical registers used for rename registers.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing a register renaming scheme for a digital data processor using a plurality of physical register files for supporting out-of-order execution of a plurality of instructions, the method comprising:

partitioning the plurality of physical register files into a first set of register files having a fixed one-to-one mapping with a first set of logical registers in an architected state and into a second set of register files being mapped to a second set having multiple copies of logical registers in a non-architected state by a register-renaming unit;

assigning an instruction tag to each of the plurality of instructions for tracking instruction dependencies;

using a DEF table to store the instruction dependencies between the plurality of instructions using the instruction tags, the DEF table being indexed by a logical register name and including one entry per logical register;

using a rename USE table indexed by the instruction tags to store logical-to-physical register mapping information shared by multiple sets of different types of non-architected copies of logical registers used by multiple threads;

using a last USE table to transfer data of the multiple sets of different types of non-architected copies of logical registers into a first set of architected registered files, the last USE table being indexed by a physical register name in a second set of rename registered files; and performing a register-renaming scheme at an instruction dispatch or wake-up/issue time in order to reduce a number of a plurality of physical register files;

wherein the register-renaming unit is a mapper;

wherein the mapper maps a first set of logical registers to a plurality of physical registers in a rename register file and maintains a copy of previous instruction dependency information for a flush/recovery function;

wherein the plurality of physical registers used by in-flight instructions are mapped to either the first set of logical registers in architected state or to a second set of logical registers in a non-architected state.

* * * * *